(12) United States Patent
Go Boncan (10) Patent No.: US 7,494,544 B2
(45) Date of Patent: Feb. 24, 2009

(54) POLYMER SHELL ENCAPSULATED GAS AS A CEMENT EXPANSION ADDITIVE

(75) Inventor: Virgilio C. Go Boncan, Spring, TX (US)

(73) Assignee: BJ Services Company, Houston, TX (US)

( * ) Notice: Subject to any disclaimer, the term of this patent is extended or adjusted under 35 U.S.C. 154(b) by 232 days.

(21) Appl. No.: 10/248,488

(22) Filed: Jan. 23, 2003

(65) Prior Publication Data

US 2004/0147406 A1 Jul. 29, 2004

(51) Int. Cl.
*C04B 16/04* (2006.01)
*C04B 28/04* (2006.01)
*C09K 8/473* (2006.01)

(52) U.S. Cl. .................. 106/672; 106/677; 106/713; 106/724; 521/56; 166/387; 166/292

(58) Field of Classification Search .................. 521/56; 106/672, 677, 713, 724; 166/292, 387
See application file for complete search history.

(56) References Cited

U.S. PATENT DOCUMENTS

| 3,021,291 | A | * | 2/1962 | Thiessen | 521/56 |
| 3,649,317 | A | | 3/1972 | Houseknecht | 106/90 |
| 4,057,526 | A | | 11/1977 | de Rook | 260/29.6 |
| 4,302,549 | A | * | 11/1981 | Crowley | 521/57 |
| 5,124,186 | A | * | 6/1992 | Wycech | 428/35.8 |
| 5,872,189 | A | | 2/1999 | Bett et al. | 525/243 |
| 6,508,305 | B1 | | 1/2003 | Brannon et al. | 166/293 |
| 2001/0018072 | A1 | * | 8/2001 | Unger | 424/484 |
| 2004/0097656 | A1 | * | 5/2004 | Nyhus et al. | 525/243 |

FOREIGN PATENT DOCUMENTS

| CA | 2402434 | * | 9/2001 |
| GB | 743866 | | 5/1953 |
| GB | 2 083 099 | | 12/1979 |
| JP | 06313130 A | * | 11/1994 |

OTHER PUBLICATIONS

British Examination Report dated Apr. 6, 2006 for GB Application No. 0401476.7.
Website printout "The Product;" www.expancel.com; printed Apr. 21, 2003.
Website printout Boud Minerals & Polymers; Supplying Minerals and polymers to industry; printed Nov. 21, 2002; www.boud.com.
"Real-Time Cement Expansion/Shrinkage Testing Under Downhole Conditions for Enhanced Annular Isolation;" Virgilio C. Goboncan, SPE, Robert L. Dillenbeck, SPE, BJ Services; SPE/IADC; Feb. 2003.
"Chemical Resistance of Expancel; Unexpanded Microspheres;" Technical Bulletin No. 7; Oct. 1, 2001.

* cited by examiner

*Primary Examiner*—Irina S Zemel
(74) *Attorney, Agent, or Firm*—Howrey LLP (57) ABSTRACT

Cement compositions containing an expandable material are disclosed. The compositions are suitable for use in oil and gas wells. An example of such an expandable material is a polymer encapsulated chemical that expands upon heating. Examples of cement compositions containing polymer encapsulated isobutane or isopentane are disclosed. The use of cement compositions containing an expandable material can reduce the formation of micro-annulus or other deleterious physical properties in the set cement.

25 Claims, 5 Drawing Sheets

POLYMER SHELL ENCAPSULATED GAS AS A CEMENT EXPANSION ADDITIVE

BACKGROUND OF INVENTION

1. Field of the Invention

The invention relates to the use of expandable materials as a cement expansion additive. Polymer encapsulated organic chemicals are disclosed as examples of such expandable materials.

2. Background of the Invention

Cement is commonly used in residential, commercial, and industrial applications. While cement is largely chemically inert and has desirable strength characteristics, it has a very high density.

Various additives are used to reduce the density of cement, while maintaining desirable strength and durability of the set product. As cement sets, the volume decreases. Various additives can be used to increase the volume of cement, while maintaining desirable strength and durability of the set product. One such additive is aluminum powder. The addition of the powder to cement results in the formation of hydrogen gas. The gas causes the cement to expand. The reactivity of the aluminum powder is modified by coating it with a resin to delay the chemical reaction. Upon mixing with the cement and water, the chemical reaction typically starts to occur after about 45-60 minutes.

While hydrogen gas will provide some cement expansion, it does present a potential safety risk due to its flammability and potentially explosive nature. Additionally, the hydrogen gas bubbles generated are not encapsulated, there is a tendency for it to move in the cement matrix, and may rise to the surface and escape the cement, thereby eliminating any potential benefits to the cement. If the gas escapes before the cement slurry is set, then little or no benefits will be achieved.

Cementing is a common technique employed during many phases of wellbore operations. For example, cement may be employed to isolate or secure various casing strings and/or liners in a well (or primary cementing). In other cases, cementing may be used in remedial operations to repair casing and/or to achieve formation isolation or secondary cementing). In still other cases, cementing may be employed during well abandonment. Cement operations performed in wellbores under high stress conditions may present particular problems, among other things, difficulty in obtaining good wellbore isolation and/or maintaining mechanical integrity of the wellbore over the life of the well. These problems may be exacerbated in those cases where wellbore and/or formation conditions promote fluid intrusion into the wellbore, including intrusion of water, gas, or other fluids.

In a wellbore, cement may be used to serve several purposes. Among these purposes are to selectively isolate particular areas of a wellbore from other areas of the wellbore. For example, cement is commonly placed in the annulus created between the outside surface of a pipe string and the inside formation surface or wall of a wellbore in order to form a sheath to seal off fluid and/or solid production from formations penetrated by the wellbore. This isolation allows a wellbore to be selectively completed to allow production from, or injection into, one or more productive formations penetrated by the wellbore. In other cases cement may be used for purposes including, but not limited to, sealing off perforations, repairing casing leaks (including leaks from damaged areas of the casing), plugging back or sealing off the lower section of a wellbore, sealing the interior of a wellbore during abandonment operations, and so on.

The normal shrinkage of cement can pose problems during cementing in oil and gas wells. Shrinkage can play a major role in the long-term cemented annular isolation. The long term seal of the annulus is jeopardized if the set cement pulls away from the pipe, casing, or from the well bore. Formation of a "micro-annulus" can occur if the shrinkage is sufficiently severe. It is desirable to add one or more additives to expand the cement's initial volume, effectively offsetting the cement's shrinkage as it sets and hardens.

In using aluminum powder in oil and gas well applications to expand the cement, the produced hydrogen gas can also increase the chance of a well blowout, in addition to the safety issues discussed above.

Thus, there exists a need for cement expansion additives with attractive chemical and safety properties. These additives would preferably be easily handled, and would offset the shrinkage exhibited by cement as it sets.

SUMMARY OF INVENTION

Expandable encapsulated materials can be used to maintain the volume of cement compositions as they set and harden. The encapsulation minimizes or prevents the escape of gas from the cement composition. Cement compositions containing the encapsulated materials can be used in oil and gas well applications. This use will decrease or minimize the occurrence of contractions and formation of micro-annulus or other deleterious physical properties commonly observed with conventional cement compositions.

BRIEF DESCRIPTION OF DRAWINGS

The following figures form part of the present specification and are included to further demonstrate certain aspects of the present invention. The invention may be better understood by reference to one or more of these figures in combination with the detailed description of specific embodiments presented herein.

DETAILED DESCRIPTION

The invention relates to compositions and methods for their use. The various embodiments of the invention involve the use of an encapsulated expandable material in cement compositions.

Compositions

Cement can be combined with an expandable material. The expandable material can be a polymer shell encapsulating a chemical that expands upon heating. The polymer shell can expand, but substantially contains the chemical within. The expandable material can be expanded once, or can be expanded and contracted multiple times with changes in temperature and pressure. The expandable material can be added in a batch or continuous process. The encapsulated expandable material is preferably non-permeable.

The expandable material can generally be of any size and shape. Generally, the expandable material will be spherical in shape, although cubes and other three dimensional shapes are possible. Sizes are generally reported as averages, as some variation in size will occur within a population of expandable materials. The unexpanded size of the material can generally be any size, such as diameters of about 5 um to about 40 um (as measured at STP; standard temperature and pressure of 25° C. and 760 mm pressure). Example unexpanded sizes include about 5 um, about 10 um, about 15 um, about 20 um, about 25 um, about 30 um, about 40 um, and ranges between any two of these values. The expanded size of the material can generally be any size, such as diameters of about 20 um to about 150 um. Example expanded sizes include about 20 um, about 30 um, about 40 um, about 50 um, about 60 um, about 70 um, about 80 um, about 90 um, about 100 um, about 110 um, about 120 um, about 130 um, about 140 um, about 150 um, and ranges between any two of these values.

The polymer shell can generally be any polymer material capable of containing the chemical. Examples of such a polymer include polystyrene, polyvinylchloride, polyester, polyethylene, polypropylene and nylon. The polymer can be a homopolymer or a copolymer. The glass transition temperature of the polymer can generally be any suitable temperature. The glass transition temperature of the polymer should preferably be lower than the intended bottom hole temperature of well. The higher the temperature of the well, the more volumetric expansion that it will allow up to the melting point of the polymer. The glass transition temperature can generally be about 170° F. (77° C.) to about 250° F. (121° C.), but other thermoplastics may be used with different glass transition temperatures. The melting point can generally be about 240° F. (116° C.) to about 340° F. (171° C.).

The expandable chemicals can be in solid, liquid, or gas forms at STP and should preferably provide a cubical or linear expansions when exposed to higher temperatures. An example of such solid materials may be paraffin with a coefficient of linear expansion of 4.77 C×$10^4$ at temperature from 38-49° C. or wax with a coefficient of linear expansion of 15.277 C×$10^4$ at temperature from 43-57° C. Chemicals that has a vapor pressure greater than 1 ATM or 760 mm of Hg at temperatures greater than room temperature or 24° C. Subliming solids may also be used. Sublimation is the vaporization of a substance from solid into the vapor state without formation of an intermediate liquid phase. The chemical preferably does not react with the polymer shell. Examples of such presently preferred chemicals include isobutane (methylpropane), isopentane (methylbutane), acetone, ethyl alcohol, methyl alcohol, argon, and hydrocarbons (CxHy, where x is 2 to 8, and y is either 2x+2 or 2x).

An example of such an expandable material is currently commercially available. Expandable microspheres are available commercially from Azko Nobel under the registered trademark EXPANCEL (www.expancel.com). EXPANCEL is available in expanded or unexpanded forms. The microspheres are offered as being useful in anti-slip coatings, Braille paper, carpet underlays, printing ink, car underbody coatings, industrial non-woven textiles, boxboard, fine paper, auto body filler and marine and hobby putties, cable fillings, cultured marble, civil explosives, model making materials, sealants, synthetic wood, and paints and crack fillers.

The expandable material can generally be added to cement in any concentration. For example, the material can be added at about 0.2 weight percent to about 40 weight percent based on the weight of the cement. Specific examples of concentrations include about 0.2 weight percent, about 0.4 weight percent, about 0.6 weight percent, about 0.8 weight percent, about 1.0 weight percent, about 1.2 weight percent, about 1.4 weight percent, about 1.6 weight percent, about 1.8 weight percent, about 2.0 weight percent, about 3.0 weight percent, about 4.0 weight percent, about 5.0 weight percent, about 10 weight percent, about 15 weight percent, about 20 weight percent, about 25 weight percent, about 30 weight percent, about 35 weight percent, about 40 weight percent, and ranges between any two of these values. The material can be added dry (dry blending) or can be added as a slurry (as a liquid additive).

The cement can generally be any type of cement such as Portland cement. The cement can generally be of any API specification Class such as A, B, C, G, or H. Examples of commercially available cements include Lafarge Class H, Dyckerhoff Class G, and Cemex Class C. ASTM specification cements such as I, II, III, IV, and V can also be used. Other suitable hydraulic cements include commercial lightweight cements such as TXI Lightweight can be used. Other cementitious materials such as cement/fly ash mixtures, slag, cement/slag mixtures, non-Portland cements such as phosphate based cement or alumina cement, ground granulated blast furnace slag, Class C or Class F fly ash, pozzolan microspheres, or ceramic microspheres may also be included in the cement compositions.

Methods of Use

The expandable materials described above can be incorporated into a cement composition. The cement composition can comprise the expandable material, and any conventional additives. The cement composition can be dry (lacking water) or wet (mixed with water). The expandable material can be added in a batch or continuous process.

Upon setting, the cement composition containing the expandable material preferably does not have a significant reduction in volume (i.e. the set volume is significantly equivalent to the unset volume). The set volume is preferably at least about 90%, about 95%, about 96%, about 97%, about 98%, about 99%, or about 100% of the unset volume. Alternatively, the set composition can have an increased volume relative to the unset composition. For example, the set volume can be about 105%, about 110%, about 115%, or about 120% of the unset volume. Excessive expansion can be undesirable depending on the application. In oil and gas wells, excessive expansion can lead to casing collapse or breakdown of the formation.

The cement composition containing the expandable material can be pumped into an oil and/or gas well to create various support structures. By substantially maintaining its unset volume, the set cement composition can reduce or minimize well fluid intrusion.

The expandable material can be added in a liquid cement composition (such as "LiquidStone", commercially available from BJ Services, Houston, Tex.). The cement system can be mixed up to several weeks prior to use. The liquid cement composition is commonly shipped to location as a liquid, rather than as a conventional dry cement mixture. The use of a liquid cement composition is useful in environmentally sensitive areas, conserves space at the drill site location, and provides improved cement bonding to the casing as well as to the wellbore, thus minimizing the potential of unwanted well fluid flow after cementing. Conventional cement expansion additives like aluminum powder or magnesium oxide or magnesium oxide/calcium carbonate blend cannot be used for this application. These types of expansion chemicals will gradually react with the cement slurry upon mixing. This reaction will continues during storage and shipping. As a result, the efficacy of the added chemicals diminishes with time. The aluminum powder will generate hydrogen gas at the storage area, potentially creating a safety issue. There is a tendency for the slurry to overflow beyond the storage tank capacity.

The expandable materials described above do not chemically react when added to a liquid cement system. As a result, it can be stored for extended periods of time with the cement system without degradation of its properties.

When used in a downhole well application, the expandable materials typically start to soften and expand at or above temperatures of 170° F. (77° C.), depending on the chemical composition of the expandable material. The expansion promotes improved cement bonding to the casing and to the formation. This improved bonding minimizes or eliminates well fluid flow through the cement matrix and minimizes or prevents annular gas intrusion.

The use of crystal growth expanding additives (such as magnesium oxide) continue to react even after the cement has set. In some situations, the final cement expansion is so significant that it causes the cement to crumble, increases permeability, decreases strength, and allows the intrusion of well fluids. Gas generating expansion additives (such as aluminum powder) are not encapsulated, and the generated gas gradually diffuses out of the cement, thereby reducing its effectiveness.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLE 1

Materials

Microspheres are commercially available as EXPANCEL (a registered trademark of Azko Nobel). EXPANCEL 461Wu-40 is a wet unexpanded product having a weight average particle size diameter of 6-9 um (60% solids), 820Wu-40 is a wet unexpanded product having a weight average particle size diameter of 10-16 um (65% solids), 053Wu-40 is a wet unexpanded product having a weight average particle size diameter of 10-16 um (75% solids), and 091 Wu-40 is a wet unexpanded product having a weight average particle size diameter of 10-16 um (70% solids). In the following examples, EXPANCELs are used as representative expandable materials, but they should not be considered to be the only expandable materials suitable for use in cement compositions.

API class H cement is commercially available from LaFarge Corporation, TXI Corporation, Texas-Lehigh Cement, Southdown Cement, Capitol Cement, and others. A sack of cement is equal to 94 pounds of cement. Additives R-3 (set retarder), R-8 (set retarder), S-8 (silica flour, maintains strength and integrity of cement at high temperature), and FL 25 (fluid loss additive) are commercially available from BJ Services Company (Houston, Tex.). In all samples, water was fresh water.

Times are indicated as hours:minutes; temperatures are indicated as either ° F. or ° C.; density is indicated as pounds per gallon (ppg); yield is indicated as cubic feet per sack of cement (per 94 pounds of cement).

EXAMPLE 2

Assay Methods

Thickening time was determined by the use of an API Pressurized Consistometer. The Pressurized Consistometer is a laboratory instrument designed to determine how long the slurry will stay fluid at simulate downhole well temperatures up to 600° F. (316° C.) and simulated pressure up to 40,000 PSI (276 MPa). Hydrocarbon oil such as mineral oil is used to pressurize the test cell. The pressurized Consistometer consists of a rotating cylindrical slurry container equipped with a stationary paddle assembly that is engaged with a potentiometer mechanism. The slurry cup with the slurry is placed inside the test cell. At the bottom of the test cell is a rotary table that revolve at a speed of 150 rpm. The bottom cover of the slurry cup is fitted with two rolled pins. The rolled pins will engage to the rotary table. The cylindrical slurry cup will turn as the rotary table rotates. During the assays, the cement viscosity will increase with time at simulated downhole temperature and pressure. The cement slurry inside the cup will drag the paddle. The frictional drag of the cement to the paddle will shift the contact arm position on the resistor in the potentiometer assembly. The changing contact arm position on the resistor will change the voltage drop flowing across the resistor. Using the potentiometer calibration values, the voltage drop across the resistor is converted to Bc (Bearden Unit of Consistency). Using a weight loaded device for potentiometer calibration, a torque of 2080 g-cm or 400 gram weigh is equivalent to 100 Bc. Cement slurries with a viscosity equivalent to 70 Bc or higher are considered unpumpable during cement operation.

The API Fluid Loss test is a method for determining how cement mix water will be leaked off from the slurry at simulated well temperatures and differential of 1000 PSI (6.9 MPa) through a 325 mesh SS screen, as specified in API Recommended Practice 10 B, twenty-second edition, December 1997. During a cementing operation, cement slurry may be pump through a permeable zone and the mix water on cement slurry with no or minimal fluid loss control will squeeze off to the permeable zone and will dehydrate the cement. When this occurs, cement properties change: reduced thickening times, reduced strength, increased slurry viscosity, and so on. As it loses more filtrate across the permeable zone, the mode of dehydrated cement increases and will eventually create a bridge preventing the completion of the cementing operation.

In designing oil well cement slurries, it is desirable that the addition of additive to the slurry such as cement expanding additives has little or no effect on other cement properties such as thickening time, fluid loss control, compressive strength, and so on, except the volumetric change aspect as shown below in Examples 2-8.

EXAMPLE 3

Evaluation of Changes in Thickening Time from Addition of EXPANCEL

Type H cement compositions were prepared containing or lacking EXPANCEL material. All samples contained 0.2 weight percent R-3 (based on weight of cement). The compositions had a density of 16.2 pounds per gallon, and a yield of 1.09 cubic feet per sack (94 pounds of cement). The thickening time was determined at a test temperature of 167° F.

(75° C.) and pressure of 6500 psi. Cement typically encounters this temperature and higher temperature in down hole oil and gas wells.

| Sample | Water (gal/sk) | EXPANCEL | Thickening time (hr:min) |
|---|---|---|---|
| 1 | 4.56 | None | 4:57 |
| 2 | 4.48 | 1 wt % 461Wu-40 | 4:54 |
| 3 | 4.48 | 1 wt % 820Wu-40 | 4:43 |

These results show that the addition of EXPANCEL to a cement composition did not have a significant effect on the thickening time.

EXAMPLE 4

Evaluation of Changes in Thickening Time from Addition of EXPANCEL

Type H cement compositions were prepared containing or lacking EXPANCEL material. All samples contained 0.35 weight percent R-3 (based on weight of cement). The compositions had a density of 16.2 pounds per gallon, and a yield of 1.09 cubic feet per sack (94 pounds of cement). The thickening time was determined at a test temperature of 201° F. (94° C.) and pressure of 7900 psi.

| Sample | Water (gal/sk) | EXPANCEL | Thickening time (hr:min) |
|---|---|---|---|
| 4 | 4.45 | None | 5:36 |
| 5 | 4.48 | 1 wt % 461Wu-40 | 5:34 |
| 6 | 4.48 | 1 wt % 820Wu-40 | 5:45 |
| 7 | 4.32 | 3 wt % 820Wu-40 | 5:20 |
| 8 | 4.48 | 1 wt % 053Wu-40 | 6:23 |

As observed in the previous example, the addition of EXPANCEL did not significantly change the thickening time of the cement. The thickening time was somewhat longer at the higher temperature of this example: 201° F. (94° C.) as compared to 167° F. (75° C.).

EXAMPLE 5

Evaluation of Changes in Compressive Strength from Addition of EXANCEL

Type H cement compositions were prepared containing or lacking EXPANCEL material. All samples contained 0.35 weight percent R-3 (based on weight of cement). The compositions had a density of 16.2 pounds per gallon, and a yield of 1.09 cubic feet per sack (per 94 pounds of cement). Water was added at 4.45 gallons per sack of cement. Samples were analyzed at a test temperature of 260° F. (127° C.) and a curing pressure of 3000 psi.

Samples were evaluated in an Ultrasonic Cement Analyzer (UCA) instrument (non-destructive sonic testing of cement) as outlined in API Recommended Practice 10 B, twenty-second edition, December 1997. The amount of time required for the sample to exhibit 50 psi and 500 psi strength was determined. The strength after 24 hours was also determined.

| Sample | EXPANCEL | UCA Compressive Strength | | |
|---|---|---|---|---|
| | | Time to 50 psi | Time to 500 psi | psi at 24 hours |
| 9 | None | 4:16 | 5:00 | 2608 |
| 10 | 1 wt % 053Wu-40 | 4:28 | 5:12 | 2653 |

The addition of EXPANCEL did not significantly change the time required for the cement to reach 50 psi or 500 psi. The sample containing EXPANCEL had a somewhat higher strength after 24 hours set time.

EXAMPLE 6

Evaluation of Changes in Fluid Loss from Addition of EXPANCEL

Type H cement compositions were prepared containing or lacking EXPANCEL material. All samples contained 0.25 weight percent R-3 and 0.8 weight percent FL-25 (based on weight of cement). The compositions had a density of 16.2 pounds per gallon, and a yield of 1.09 cubic feet per sack (per 94 pounds of cement). Water was added at 4.54 gallons per sack of cement (without EXPANCEL) or at 4.48 gallons per sack of cement (with EXPANCEL). Samples were analyzed at a test temperature of 201° F. (94° C.) and a differential pressure of 1000 psi. The fluid loss is measured as ml per 30 minutes.

| Sample | EXPANCEL | API fluid loss (cc/30 min.) |
|---|---|---|
| 11 | None | 41 |
| 12 | 1 wt % 053Wu-40 | 51 |

No significant change in fluid loss values were observed with the addition of EXPANCEL.

EXAMPLE 7

Evaluation of Thickening Times at Elevated Temperatures

Type H cement compositions were prepared containing or lacking EXPANCEL material. All samples contained 35 weight percent S-8 (based on weight of cement). The compositions had a density of 16.2 pounds per gallon, and a yield of 1.44 cubic feet per sack (per 94 pounds of cement). Samples were analyzed at a test temperature of 258° F. (126° C.) and a pressure of 11400 psi.

| Sample | Water (gal/sk) | R-8 | EXPANCEL | Thickening time (hr:min) |
|---|---|---|---|---|
| 13 | 5.54 | 0.2 | None | 1:13 |
| 14 | 5.54 | 0.2 | 1 wt % 091Wu-40 | 1:12 |
| 15 | 5.62 | 0.45 | None | 4:33 |
| 16 | 5.53 | 0.45 | 1 wt % 091Wu-40 | 4:00 |
| 17 | 5.63 | 0.35 | None | 3:07 |
| 18 | 5.54 | 0.35 | 1 wt % 461Wu-40 | 2:47 |
| 19 | 5.54 | 0.354 | 1 wt % 820Wu-40 | 2:57 |

The slurries containing EXPANCEL had no significant change in thickening time as compared to the base slurry (lacking EXPANCEL).

EXAMPLE 8

Evaluation of Thickening Times and UCA Compressive Strength at Elevated Temperatures Type H cement compositions were prepared containing or lacking EXPANCEL material. All samples contained 1 weight percent R-8 and 35 weight percent S-8 (based on weight of cement). The compositions had a density of 16.2 pounds per gallon, and a yield of 1.44 cubic feet per sack (per 94 pounds of cement). Water was added at 5.58 gallons per sack of cement (without EXPANCEL) or at 5.49 gallons per sack of cement (with EXPANCEL). Thickening times were determined at 326° F. (163° C.) and a pressure of 15300 psi. UCA compressive strengths were determined at 326° F. (163° C.) and 3000 psi.

| Sample | EXPANCEL | Thickening time (hr:min) | UCA Compressive Strength | | |
|---|---|---|---|---|---|
| | | | Time to 50 psi | Time to 500 psi | psi at 24 hours |
| 20 | None | 3:17 | 7:28 | 8:00 | 4011 |
| 21 | 1 wt % 091Wu-40 | 4:50 | 2:40 | 6:48 | 3471 |

The slurry containing EXPANCEL ran slightly longer during the thickening time test.

EXAMPLE 9

Evaluation of Linear Expansion of Cement Compositions

Class H cement compositions were prepared having densities of 16.2 pounds per gallon.

| Sample | Composition | Water (gal/sk) | Yield (ft³/sk) |
|---|---|---|---|
| 22 | 0.3 wt % R-3<br>0.2 wt % 053Wu-40 | 4.52 | 1.09 |
| 23 | 35 wt % S-8<br>0.5 wt % R-3 | 5.61 | 1.44 |
| 24 | 35 wt % S-8<br>0.5 wt % R-3<br>0.2 wt % 053Wu-40 | 5.61 | 1.44 |
| 25 | 35 wt % S-8<br>1 wt % R-8 | 5.58 | 1.44 |
| 26 | 35 wt % S-8<br>0.4 wt % R-8<br>0.2 wt % 091Wu-40 | 5.62 | 1.44 |

The compositions were brought from room temperature to the test temperature over four hours, and held at temperature for a total of between 80 and 120 hours. The temperature, test pressure, and percent linear expansion were plotted. After 4 hours of curing, the final test temperature and pressure has been achieved. The test device has stabilized at this point and the LDT (linear displacement transducer) reading was set to zero value.

Figure 1:
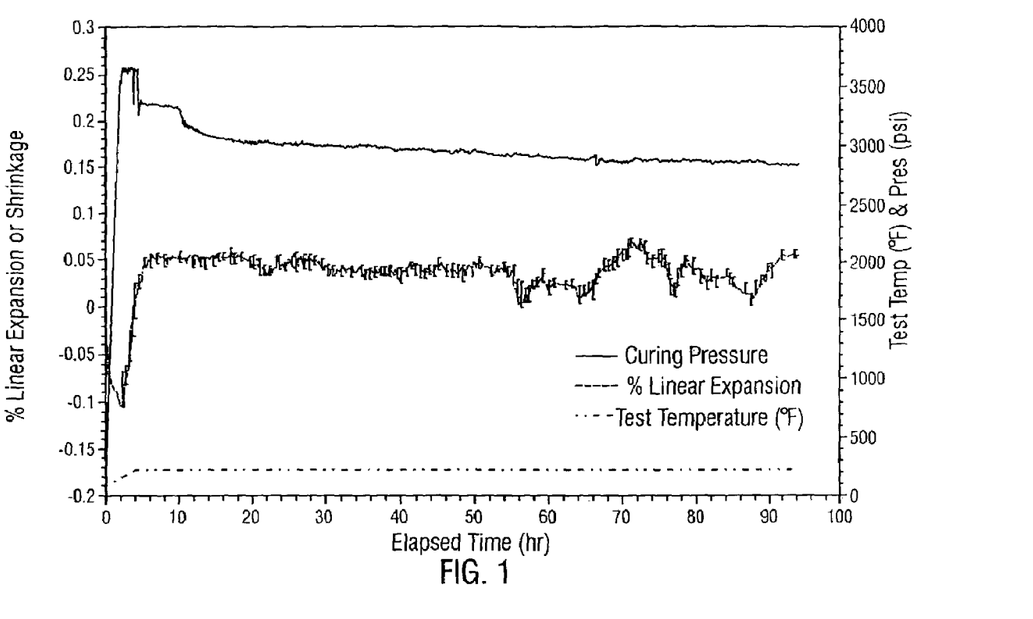
FIG. 1 is a plot of temperature, pressure, and percent linear expansion for cement composition containing EXPANCEL.
Figure 2:
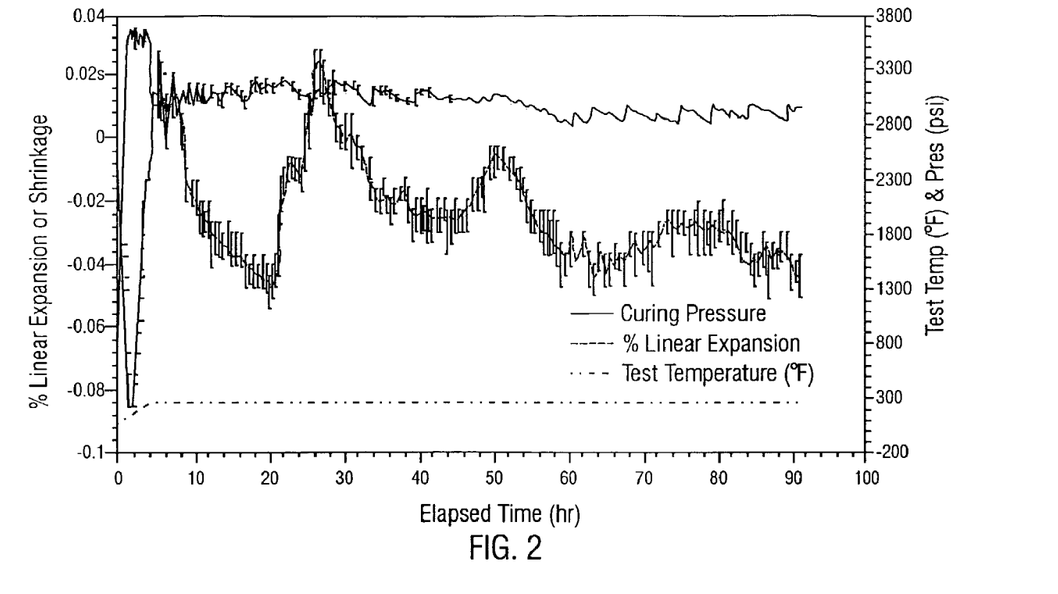
FIG. 2 is a plot of temperature, pressure, and percent linear shrinkage for cement composition not containing EXPANCEL.
Figure 3:
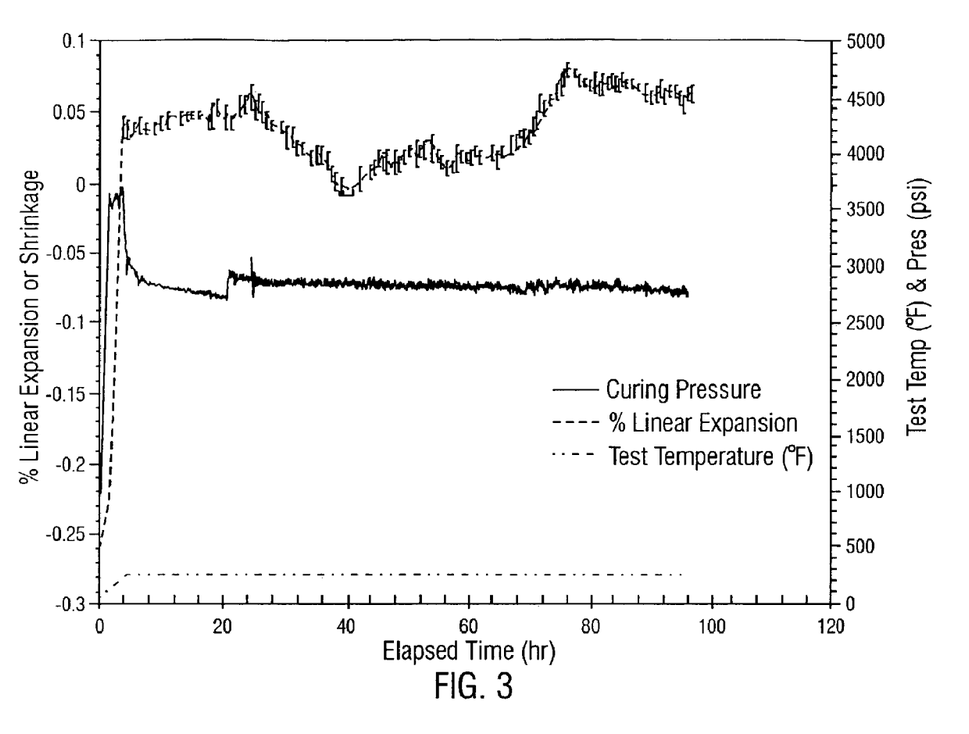
FIG. 3 is a plot of temperature, pressure, and percent linear expansion for cement composition containing EXPANCEL.
Figure 4:
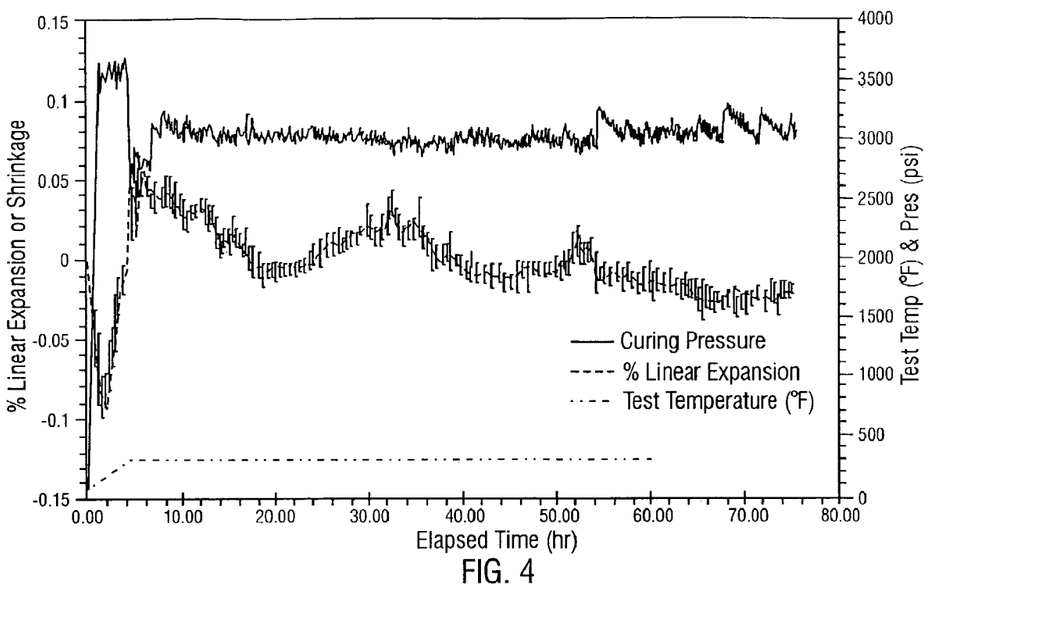
FIG. 4 is a plot of temperature, pressure, and percent linear shrinkage for cement composition not containing EXPANCEL.
Figure 5:
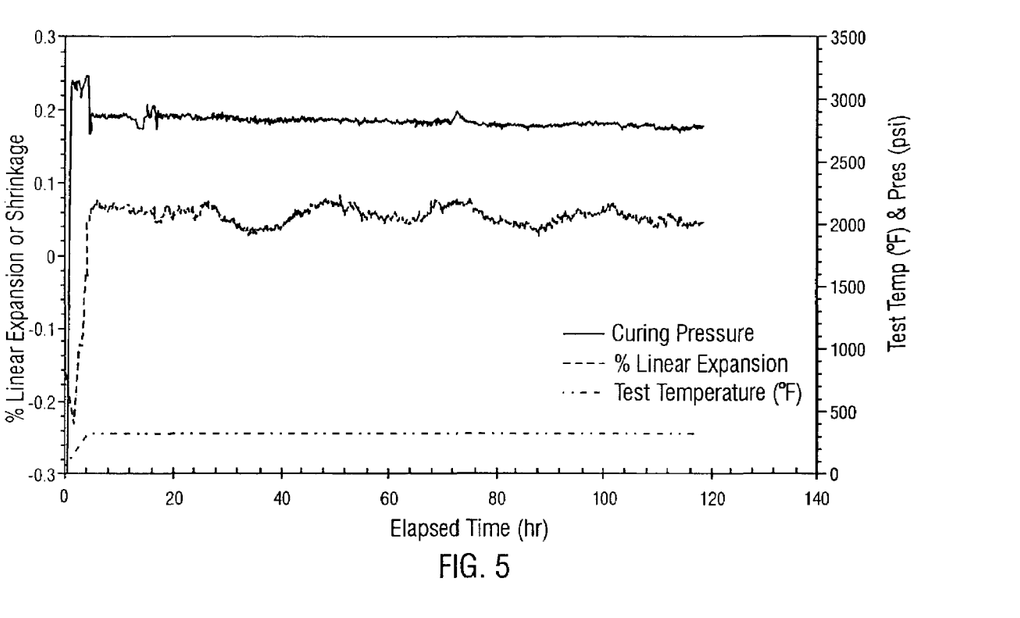
FIG. 5 is a plot of temperature, pressure, and percent linear expansion for cement composition containing EXPANCEL.

| Sample | Temperature | Figure |
|---|---|---|
| 22 | 201° F. (94° C.) | 1 |
| 23 | 266° F. (130° C.) | 2 |
| 24 | 266° F. (130° C.) | 3 |
| 25 | 350° F. (177° C.) | 4 |
| 26 | 320° F. (160° C.) | 5 |

In the Figures, positive values indicates cement linear expansion, while negative values indicates cement linear contraction or shrinkage. The samples containing EXPANCEL (FIGS. 1, 3, and 5) show expansion, while the samples lacking EXPANCEL often show contraction of the cement.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the methods described herein without departing from the concept and scope of the invention. More specifically, it will be apparent that certain agents which are chemically related may be substituted for the agents described herein while the same or similar results would be achieved. All such similar substitutes and modifications apparent to those skilled in the art are deemed to be within the scope and concept of the invention.

The invention claimed is:

1. A method of setting cement to reduce contraction of the cement, the method comprising:
   contacting cement, water, and an expandable material comprising a polymer encapsulated organic chemical to prepare a slurry, wherein the expandable material is unexpanded;
   heating the slurry wherein the expandable material expands; and
   allowing the slurry to harden to prepare a set cement product.

2. The method of claim 1, wherein the volume of the set cement product is at least about 90% of the volume of the slurry.

3. The method of claim 1, wherein the volume of the set cement product is about the same as the volume of the slurry.

4. The method of claim 1, wherein the volume of the set cement product is about 100% to about 120% of the volume of the slurry.

5. A method of cementing a wellbore, the method comprising:
   contacting cement, water, and an expandable material comprising a polymer encapsulated organic chemical to prepare a slurry, wherein the expandable material is unexpanded;
   pumping the slurry into the wellbore, wherein the slurry is heated and the expandable material expands; and
   allowing the slurry to harden to prepare a set cement product.

6. The method of claim 5, wherein the volume of the set cement product is about the same as the volume of the slurry.

7. The method of claim 5, wherein the volume of the set cement product is about 100% to about 120% of the volume of the slurry.

8. The method of claim 5, wherein the polymer encapsulated organic chemical has a vapor pressure greater than about 760 mm mercury at temperatures higher than about 24° C.

9. The method of claim 5, wherein the polymer encapsulated organic chemical is a hydrocarbon of formula CxHy, where x is 2 to 8 and y is either 2x+2 or 2x.

10. The method of claim 5, wherein the polymer is polystyrene, polyvinylchloride, polyester, polyethylene, polypropylene, or nylon.

11. The method of claim 5, wherein the organic chemical is isobutane or isopentane.

12. The method of claim 5, wherein the polymer has a glass transition temperature of about 170° F. (77° C.) to about 250° F. (121° C.).

13. The method of claim 5, wherein the polymer has a melting point of about 240° F. (116° C.) to about 340° F. (171° C.).

14. The method of claim 5, wherein the expandable material has an average diameter at STP of about 5 μm to about 40 μm.

15. The method of claim 5, wherein the expandable material is present in the composition at about 0.2 weight percent to about 40 weight percent based on the weight of the cement.

16. The method of claim 5, wherein the expandable material is present in the composition at about 0.2 weight percent to about 2 weight percent based on the weight of the cement.

17. The method of claim 1, wherein the polymer encapsulated organic chemical has a vapor pressure greater than about 760 mm mercury at temperatures higher than about 24° C.

18. The method of claim 1, wherein the polymer encapsulated organic chemical is a hydrocarbon of formula CxHy, where x is 2 to 8 and y is either 2x+2 or 2x.

19. The method of claim 1, wherein the polymer is polystyrene, polyvinylchloride, polyester, polyethylene, polypropylene, or nylon.

20. The method of claim 1, wherein the organic chemical is isobutane or isopentane.

21. The method of claim 1, wherein the polymer has a glass transition temperature of about 170° F. (77° C.) to about 250° F. (121° C.).

22. The method of claim 1, wherein the polymer has a melting point of about 240° F. (116° C.) to about 340° F. (171° C.).

23. The method of claim 1, wherein the expandable material has an average diameter at STP of about 5 μm to about 40 μm.

24. The method of claim 1, wherein the expandable material is present in the composition at about 0.2 weight percent to about 40 weight percent based on the weight of the cement.

25. The method of claim 1, wherein the expandable material is present in the composition at about 0.2 weight percent to about 2 weight percent based on the weight of the cement.

* * * * *